(12) United States Patent
Ogilvie et al.

(10) Patent No.: US 7,330,925 B2
(45) Date of Patent: Feb. 12, 2008

(54) TRANSACTION FLOW CONTROL MECHANISM FOR A BUS BRIDGE

(75) Inventors: Clarence Rosser Ogilvie, Huntington, VT (US); Charles S. Woodruff, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/064,722

(22) Filed: Feb. 24, 2005

(65) Prior Publication Data

US 2006/0190662 A1 Aug. 24, 2006

(51) Int. Cl.
*G06F 13/36* (2006.01)
*G06F 12/00* (2006.01)

(52) U.S. Cl. ............... 710/310; 710/314; 710/306; 710/311; 710/315; 711/146; 711/145

(58) Field of Classification Search ............... 710/310
See application file for complete search history.

(56) References Cited

U.S. PATENT DOCUMENTS

| | | | |
|---|---|---|---|
| 4,281,381 A | 7/1981 | Ahuja et al. | |
| 5,038,346 A | 8/1991 | Courtois | |
| 5,546,546 A | 8/1996 | Bell et al. | |
| 5,581,705 A | 12/1996 | Passint et al. | |
| 5,740,409 A | 4/1998 | Deering | |
| 5,778,096 A | 7/1998 | Stearns | |
| 5,835,739 A | 11/1998 | Bell et al. | |
| 5,835,741 A * | 11/1998 | Elkhoury et al. ........... 710/310 |
| 5,841,973 A | 11/1998 | Kessler et al. | |
| 5,893,151 A | 4/1999 | Merchant | |
| 6,021,451 A | 2/2000 | Bell et al. | |
| 6,055,608 A | 4/2000 | Arimilli et al. | |
| 6,065,087 A | 5/2000 | Keaveny et al. | |
| 6,124,868 A | 9/2000 | Asaro et al. | |
| 6,138,218 A | 10/2000 | Arimilli et al. | |
| 6,247,086 B1 * | 6/2001 | Allingham ................... 710/314 |
| 6,252,849 B1 | 6/2001 | Rom et al. | |
| 6,363,438 B1 | 3/2002 | Williams et al. | |
| 6,405,276 B1 | 6/2002 | Chen et al. | |
| 6,449,699 B2 | 9/2002 | Franke et al. | |
| 6,477,610 B1 | 11/2002 | Willenborg | |
| 6,502,154 B1 | 12/2002 | Meredith et al. | |
| 6,502,157 B1 | 12/2002 | Batchelor et al. | |
| 6,516,379 B1 * | 2/2003 | Deshpande et al. ......... 710/310 |
| 6,529,990 B1 * | 3/2003 | Kruse et al. ................. 710/310 |
| 6,556,952 B1 * | 4/2003 | Magro ......................... 702/183 |

(Continued)

OTHER PUBLICATIONS

John L. Hennessy et al., *Computer Architecture: A Quantitative Approach*, Second Edition, Chapter 8: Multiprocessors, Morgan Kaufmann Publishing, pp. 638-639 and 680 (1996).

*Primary Examiner*—Paul R. Myers
*Assistant Examiner*—Brian Misiura
(74) *Attorney, Agent, or Firm*—Martin & Associates, LLC

(57) ABSTRACT

A transaction flow control mechanism is disclosed for a bus bridge in a high speed computer system with a high speed interface for a graphics processor. A preferred embodiment provides a flow control mechanism for the bus bridge between a GPUL bus for a GPUL PowerPC microprocessor from International Business Machines Corporation (IBM) and a high speed interface. A preferred embodiment of the invention is a bus transceiver on a multi-chip module.

19 Claims, 14 Drawing Sheets

U.S. PATENT DOCUMENTS

| | | |
|---|---|---|
| 6,571,308 B1 * | 5/2003 | Reiss et al. ................. 710/315 |
| 6,581,116 B1 | 6/2003 | Arimilli et al. |
| 6,668,309 B2 | 12/2003 | Bachand et al. |
| 6,694,383 B2 | 2/2004 | Nguyen et al. |
| 6,725,296 B2 | 4/2004 | Craddock et al. |
| 6,751,695 B1 | 6/2004 | Jirgal |
| 6,799,317 B1 | 9/2004 | Heywood et al. |
| 6,801,207 B1 | 10/2004 | Tischler et al. |
| 6,801,208 B2 | 10/2004 | Keshava et al. |
| 6,816,161 B2 | 11/2004 | Lavelle et al. |
| 6,820,143 B2 | 11/2004 | Day et al. |
| 6,820,174 B2 | 11/2004 | Vanderwiel |
| 6,848,032 B2 * | 1/2005 | Benkual et al. ............. 711/146 |
| 6,886,048 B2 | 4/2005 | Richard et al. |
| 6,889,284 B1 | 5/2005 | Nizar et al. |
| 6,978,319 B1 | 12/2005 | Rostoker et al. |
| 6,985,988 B1 | 1/2006 | Nsame |
| 6,993,632 B2 * | 1/2006 | Kruckemyer et al. ....... 711/145 |
| 7,054,987 B1 | 5/2006 | Reed et al. |
| 7,124,232 B2 | 10/2006 | Takeda et al. |
| 7,143,246 B2 * | 11/2006 | Johns ......................... 711/146 |
| 2004/0117592 A1 | 6/2004 | Day et al. |
| 2004/0156199 A1 | 8/2004 | Rivas et al. |
| 2004/0162946 A1 | 8/2004 | Day et al. |
| 2004/0168011 A1 | 8/2004 | Hemming |
| 2004/0263519 A1 | 12/2004 | Andrews et al. |
| 2006/0069788 A1 | 3/2006 | Blackmore et al. |
| 2006/0190651 A1 * | 8/2006 | Ogilvie et al. ............... 710/220 |
| 2006/0190655 A1 * | 8/2006 | Kautzman et al. .......... 710/306 |
| 2006/0190659 A1 * | 8/2006 | Biran et al. ................. 710/310 |
| 2006/0190660 A1 * | 8/2006 | Horton et al. ............... 710/310 |
| 2006/0190661 A1 * | 8/2006 | Ogilvie et al. ............... 710/310 |
| 2006/0190667 A1 * | 8/2006 | Drehmel et al. ............. 710/315 |
| 2006/0190668 A1 * | 8/2006 | Biran et al. ................. 710/315 |

* cited by examiner

TRANSACTION FLOW CONTROL MECHANISM FOR A BUS BRIDGE

RELATED APPLICATIONS

The present application is related to the following applications, which are incorporated herein by reference:

"Method and System for Ordering Requests at a Bus Interface", Ogilvie et al., Ser. No. 11/064,728, co-filed herewith U.S. Pat. No. 7,194,567;

"Data Ordering Translation Between Linear and Interleaved Domains at a Bus Interface", Horton et al., Ser. No. 11/064,569, co-filed herewith U.S. Pat. No. 7,206,886;

"Method and System for Controlling Forwarding or Terminating of a Request at a Bus Interface Based on Buffer Availability", Ogilvie et al., Ser. No. 11/064,570, co-filed herewith;

"Computer System Bus Bridge", Biran et al., Ser. No. 11/064,568, co-filed herewith;

"Apparatus and Method for Transaction Tag Mapping Between Bus Domains", Kautzman et al., Ser. No. 11/064,567, co-filed herewith;

"Pipeline Bit Handling Circuit and Method for a Bus Bridge", Drehmel et al., Ser. No. 11/064,744, co-filed herewith; and "Computer System Architecture", Biran et al., Ser. No. 11/064,745, co-filed herewith.

BACKGROUND OF THE INVENTION

1. Technical Field

This invention generally relates to computer systems, and more specifically relates to a transaction flow control mechanism for a bus bridge in a computer system.

2. Background Art

Computer processors and computer systems are constantly evolving and improving. Ever faster computer processor systems are needed in the computer gaming industry to provide continued improvement in gaming performance. The PowerPC microprocessor is a family of processors available from International Business Machines Corporation (IBM). A newer version and faster version of the PowerPC is known as the Giga-Processor Ultralite (GPUL).

The computer gaming industry has a need for a high speed processor with a high speed interface that can readily interface with a graphics processor. Without a higher speed interface connection the computer gaming industry will not be able to continue to offer continuing quality improvements to the computer gaming experience.

DISCLOSURE OF INVENTION

The present invention provides a bus bridge for a high speed computer processor system with a high speed interface for a graphics processor. The invention provides a bus bridge between a GPUL bus for a GPUL PowerPC microprocessor from International Business Machines Corporation (IBM) and a high speed interface. A preferred embodiment of the invention is a bus transceiver on a multi-chip module.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Bus Overview

Figure 1:
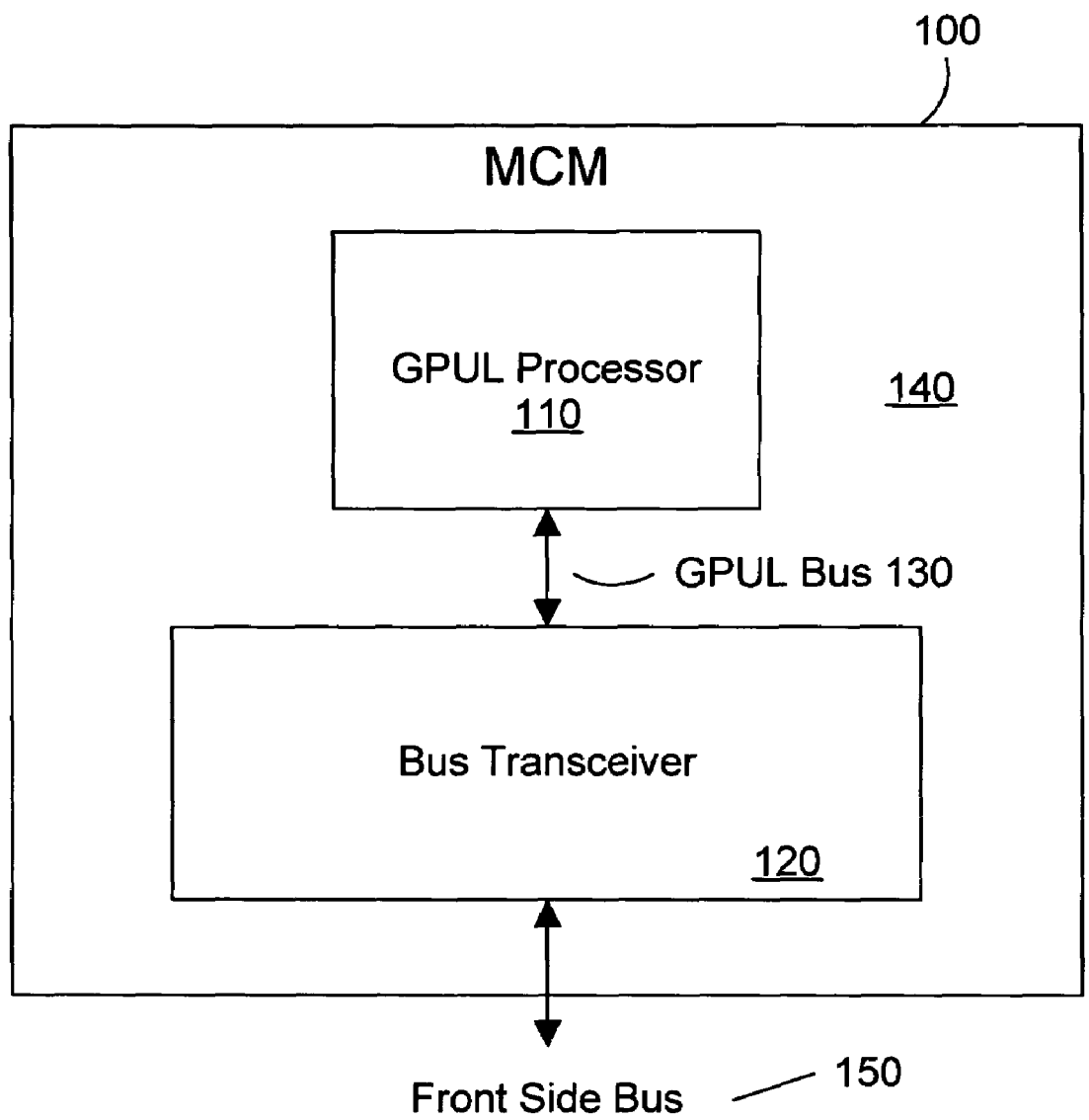
FIG. 1 is a block diagram of a computer system in accordance with the preferred embodiments.

The present invention provides a bus bridge between two high speed computer buses. The preferred embodiment is a bus bridge between a GPUL bus for a GPUL PowerPC microprocessor from International Business Machines Corporation (IBM) and an output high speed interface (MPI bus). Published information is available about the GPUL processor 110 and the GPUL bus 130 from various sources including IBM's website. This section provides an overview of these two buses.

API Bus

The API bus is sometimes referred to as the PowerPC 970FX interface bus, GPUL Bus or the PI bus (in the PowerPC's specifications). This document primarily uses the term API bus, but the other terms are essentially interchangeable. The API bus consists of a set of unidirectional, point-to-point bus segments for maximum data transfer rates. No bus-level arbitration is required. An Address/Data (AD) bus segment, a Transfer Handshake (TH) bus segment, and a Snoop Response (SR) bus segment exist in each direction, outbound and inbound. The terms packet, beat, master, and slave are defined in the following paragraphs.

Data is transferred across a bus in beats from master to slave. A beat is a timing event relative to the rising or falling edge of the clock signal. Nominally there are two beats per clock cycle (one for the rising edge and one for the falling edge).

A packet is the fundamental protocol data unit for the API bus. A non-null packet consists of an even number of data elements that are sequentially transferred across a source-synchronous bus at the rate of one element per bus beat. The number of bits in each data element equals the width of the bus. Packets are used for sending commands, reading and writing data, maintaining distributed cache coherency, and transfer-protocol handshaking.

A sender or source of packets for a bus segment is called a master and a receiver or recipient is called a slave. For example, on an outbound processor bus segment, the North Bridge is the slave and the processor is the master. On an inbound processor bus segment, the north bridge is the master and the processor is the slave. Four basic packet types are defined: null packets, command packets, data packets, and transfer-handshake packets. Non-null packet lengths are always an even number of beats. Null packets are sent across the address/data bus. For the null packet all bits are zero. Null packets are ignored by slave devices. Command packets are sent across the address/data bus. These are further partitioned into three types: read/command packets, write-command packets, and coherency-control packets. Data packets are also sent across the address/data bus. These are further partitioned into two types: read-data packets and write-data packets. A write-data packet immediately follows a write-command packet. A read-data packet is sent in response to a read-command packet or a cache-coherency snoop operation. A data read header contains the address of the command, the command type, and transfer details.

Transfer-handshake packets are sent across the transfer handshake bus. This packet is issued to confirm receipt and indicate the condition of the received command packet or data packet. Condition encoding includes Acknowledge, Retry, Parity Error, or Null/Idle. A transfer-handshake packet is two beats in length.

The API bus includes an Address/Data (AD) bus segment, a Transfer Handshake (TH) bus segment, and a Snoop Response (SR) bus segment in each direction, outbound and inbound. The Transfer Handshake bus sends transfer-handshake packets which confirm command or data packets were received on the Address/Data bus. The Transfer Handshake bus consists of one 1-bit outbound bus segment (THO) and one 1-bit inbound bus segment (THI). Every device issuing a command packet, data packet, or reflected command packet to the Address/Data bus receives a transfer-handshake packet via the Transfer Handshake bus some fixed number of beats after issuing the command or data packet. Each Transfer Handshake bus segment sends transfer packets for command and data packets transferred in the opposite direction. That is, the outbound Transfer Handshake bus sends acknowledge packets for the command and data packets received on the inbound AD bus. There is no dependency or relationship between packets on the outbound Address/Data bus and the outbound Transfer Handshake bus.

A transfer-handshake packet might result in a command packet being reissued to the bus due to a command queue data buffer full condition. A transaction remains active until it has passed all response windows. For write transactions this includes the last beat of the data payload. Since commands might be retried for queue or buffer full conditions, transactions that must be ordered cannot be simultaneously in the active state. A write transaction issued by the processor can be retried. There are two transfer-handshake packets issued by the slave for a write transaction. The first packet is for the write-command packet and the second for the write-data packet. For read transactions, the processor will not retry inbound (memory to processor) transfers. Reflected commands, i.e., snoop requests (inbound from North Bridge to processor), cannot be retried. This is necessary to ensure a fixed snoop window is maintained.

The Snoop Response bus supports global snooping activities to maintain cache coherency. This bus is used by a processor to respond to a reflected command packet received on the API bus. The Snoop Response bus consists of one 2-bit outbound bus segment (SRO) and one 2-bit inbound bus segment (SRI). The bus segments can detect single bit errors.

API Bus Summary

The address portion of the bus is 42 bits wide and is transferred in 2 beats. Data is 64 bits wide and transferred across a bus in a maximum of 4 bytes/beats from master to slave or slave to master. The API bus has a unified command phase and data phase for bus transactions. A single tag is used to identify an entire bus transaction for both command phase and data phase. Tags are unique when bus transactions are outstanding. Each command tenure contains a target slave address, the master's requestor unit id, the transfer type, the transfer size, an address modifier, and transaction tag for the entire transaction. The size of the single transaction tag is m−1 bits, with respect to the API bus command destination tag.

The API bus supports the modified intervention address snoop response protocol which effectively allows a master device to request and obtain a cache line of 128 bytes from another master device. Bus transactions can have three phases: a command phase, snoop phase and a data phase. Command only transactions are possible, which include a command phase and snoop phase. Cache line coherency is supported by reflecting commands to other master and slave devices attached to the bus coupled with a bus snooping protocol in the snoop phase. The API bus supports the modified intervention address snoop response protocol, which allows a master device to request a cache line from another master device.

The MPI Bus and Comparison to the API Bus

The MPI bus is a microprocessor bus of equal or higher performance than the API bus. The MPI bus also supports attachment of multiple master and slave devices. The address bus is 42 bits wide and is transferred in 1 beat. Data is transferred across a bus in a maximum 16 bytes/beats from master to slave or slave to master. The data bus is 128 bits wide. Each complete bus transaction is split into unique tagged command transaction phases and data transaction phases, which is different from unified transaction on the API bus.

There are a total of three tags on the API bus that are used to mark complete bus transactions. Two are used in the command phase the third is used in the data phase. Each command phase uses a destination tag and response acknowledge tag. The command destination tag (grttag) indicates the unique command for which the response is destined. The size of this command destination tag is m bits, and is one bit larger that the command transaction tag on the API bus. The response acknowledge tag (gratag) indicates the unique unit which responds to the issued command. The data transaction tag (dtag) indicates the unique data transfer. Tags are unique when bus transactions are outstanding. Since the data phase has its own unique dtag, the data phase of one transaction may finish out of order with respect to the data phase of another transaction.

Each command contains a target slave address, the requestor's unit id, transfer type, transfer size, an address modifier, and the command destination tag. The command phase is composed of a request tenure, reflected command tenure, and then a global snoop response tenure. The request tenure issues the command, with a destination tag. The reflected command tenure, reflects the command on the bus and then returns a master slave snoop response (gresp) to the MPI.

The global snoop response tenure provides a combined response from all units on the bus via the CBI, with the original destination tag and the response acknowledge tag (gratag). The data transaction phase is composed of the data request tenure and the data transfer tenure. The data transaction phase occurs independently after the command phase is completed if data transfer is required. In the data request tenure, a master requests to transfer data and it waits until it gets a grant from the target slave device. The data transfer tenure begins after the grant is received. The master provides the data transaction tag, and the data transfers while the data valid signal is active.

Command only transactions are possible, which consist of only a command phase. Cache line coherency is supported by the command phase by the reflected command tenure and the global snoop response tenure. Supports the modified intervention address snoop response protocol, which allows a master device to request a cache line from another master device.

The MPI bus contains a credit mechanism to indicate availability of available transaction buffer resources. This credit mechanism is used by MPI masters to pace their issuance of new transactions commands.

Description of the Preferred Embodiments

FIG. 1 illustrates a block diagram of a computer processor system 100 according to a preferred embodiment. The computer processor system 100 includes a Giga-Processor Ultralite (GPUL) 110 for the central processing unit. The GPUL is connected to an ASIC bus transceiver 120 with a GPUL bus 130. The illustrated embodiment shows a single GPUL processor 110 but it is understood that multiple processors could be connected to the GPUL bus 130. The GPUL 110 and the ASCI bus transceiver 120 are interconnected on a Multi-Chip Module (MCM) 140. In other embodiments (not shown) the processor(s) and the transceiver are integrated on a single chip. Communication with the computer system 100 is provided over a Front Side Bus (FSB) 150.

In the preferred embodiment, the GPUL 110 is a prior art processor core from International Business Machines Corporation (IBM) called the IBM PowerPC 970FX RISC microprocessor. The GPUL 110 provides high performance processing by manipulating data in 64-bit chunks and accelerating compute-intensive workloads like multimedia and graphics through specialized circuitry known as a single instruction multiple data (SIMD) unit. The GPUL 110 processor incorporates a GPUL bus 130 for a communications link. The GPUL bus 130 is also sometimes referred to as the API bus. In the illustrated embodiment, the GPUL bus 130 is connected to a bus transceiver 120.

Figure 2:
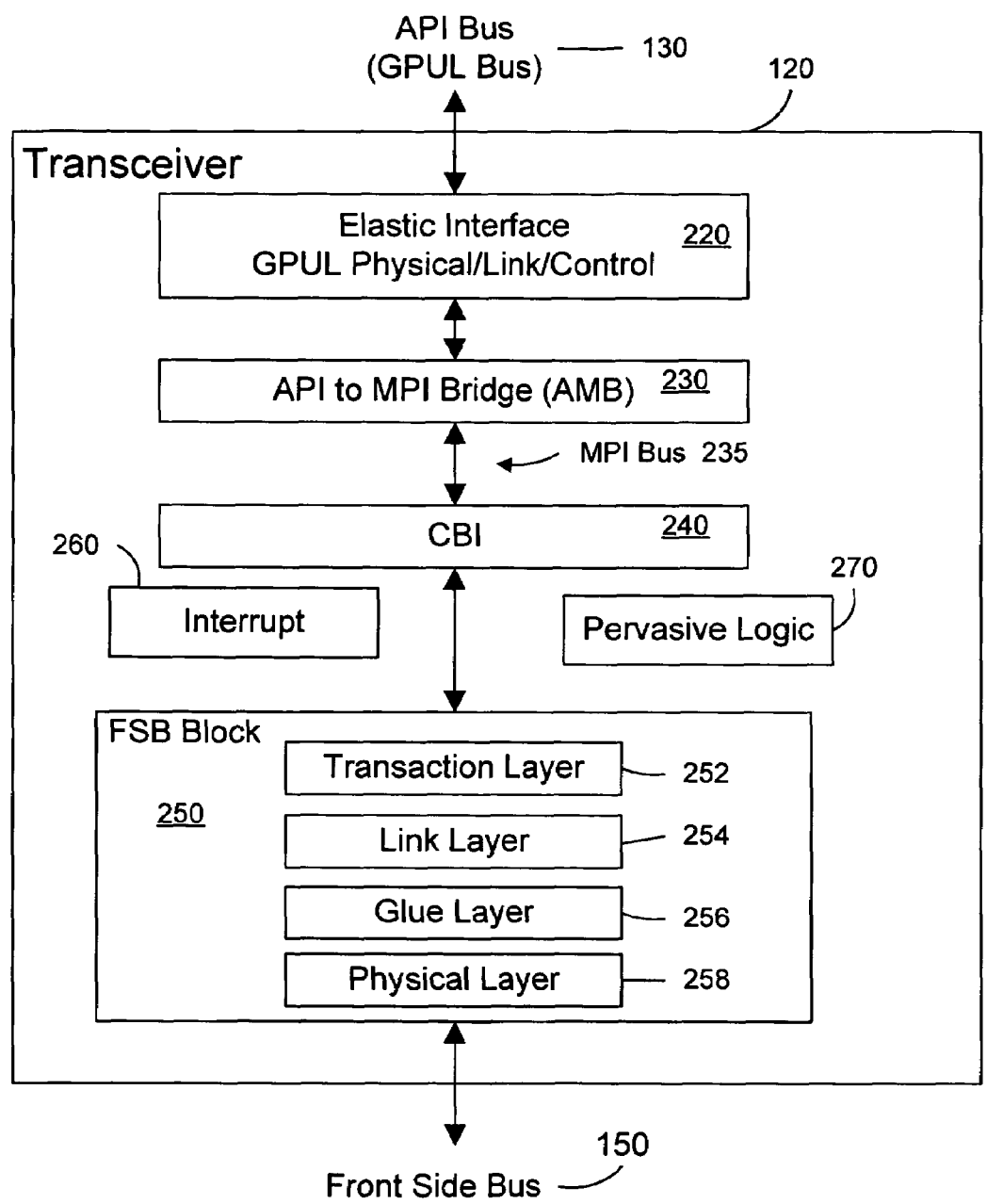
FIG. 2 is a block diagram of the bus transceiver shown in the computer system of FIG. 1.

FIG. 2 illustrates a block diagram of the bus transceiver 120 according to preferred embodiments. The bus transceiver 120 includes an elastic interface 220 that is the physical/link/control layer for the transceiver connection to the GPUL processor over the API bus 130. The elastic interface is connected to the API to MPI Bridge (AMB) 230. The AMB 230 is a bus bridge that provides protocol conversion between the MPI bus 235 and the API bus 130 protocols. The MPI bus 235 connects the AMB 230 to the Common Bus Interface (CBI) block 240. The CBI connects to the Front Side Bus (FSB) block 250. The FSB block provides I/O connections for the bus transceiver 120 to the Front Side Bus (FSB) 150. The FSB block 250 includes a transaction layer 252, a link layer 254, a glue layer 256 and a physical layer 258. The bus transceiver 120 also includes an interrupt block 260, and a pervasive logic block 270. Each of these blocks in bus transceiver 120 is described further in the co-filed applications referenced above.

Figure 3:
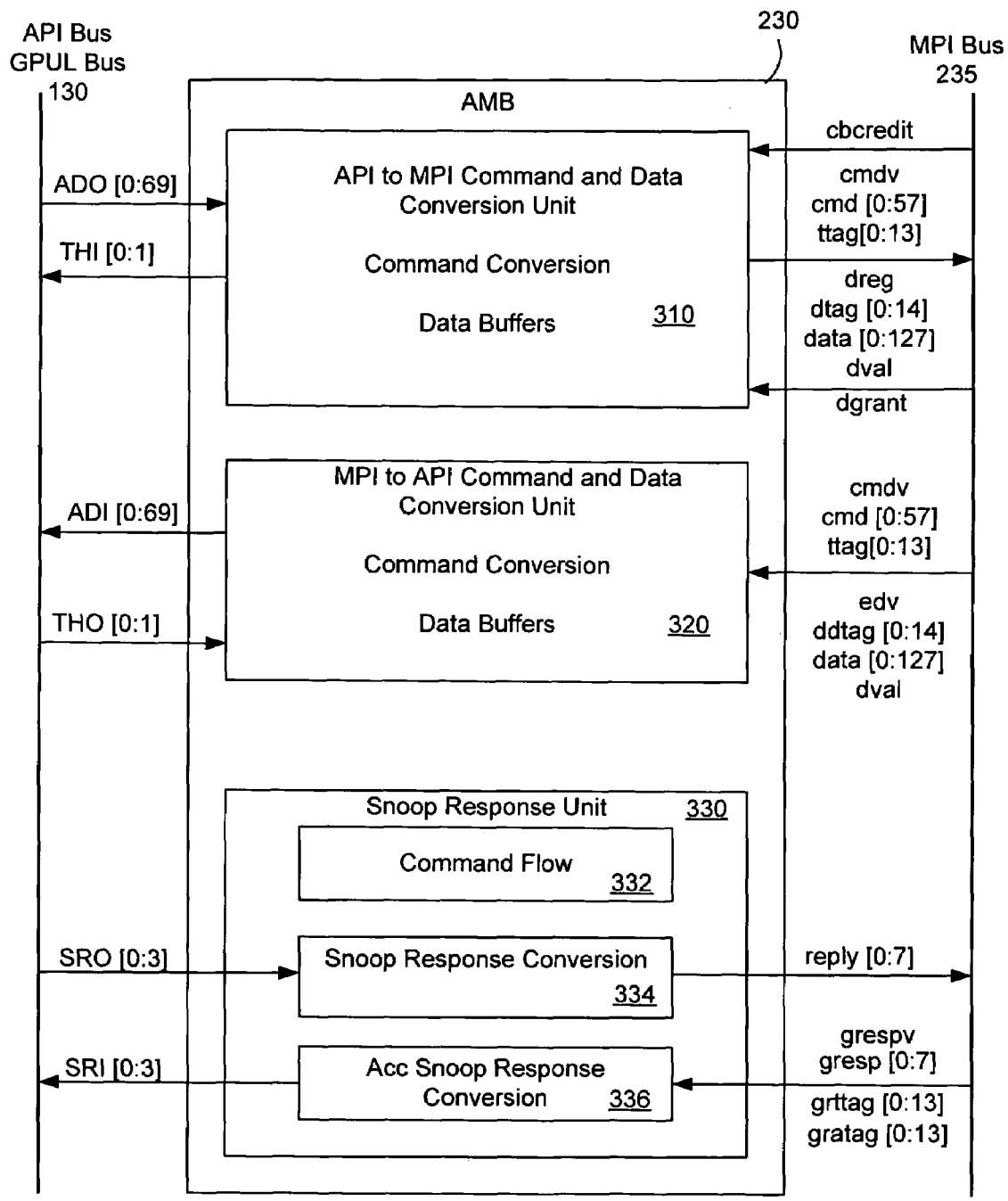
FIG. 3 is a block diagram of the API to MPI Bridge in accordance with the preferred embodiments.

FIG. 3 further illustrates the AMB 230. The AMB 230 is the conversion logic between the API bus 130 and MPI bus 235. The AMB 230 transfers commands, data, and coherency snoop transactions back and forth between the elastic interface 220 and the CBI 240 in FIG. 2. The AMB is made up of three units: the API to MPI command and data conversion unit 310, the MPI to API command and data conversion unit 320 and the snoop response unit 330. The primary function of each unit is to convert the appropriate commands, data, and snoop responses from the API bus to the MPI bus and from the MPI bus to the API bus.

Figure 4:
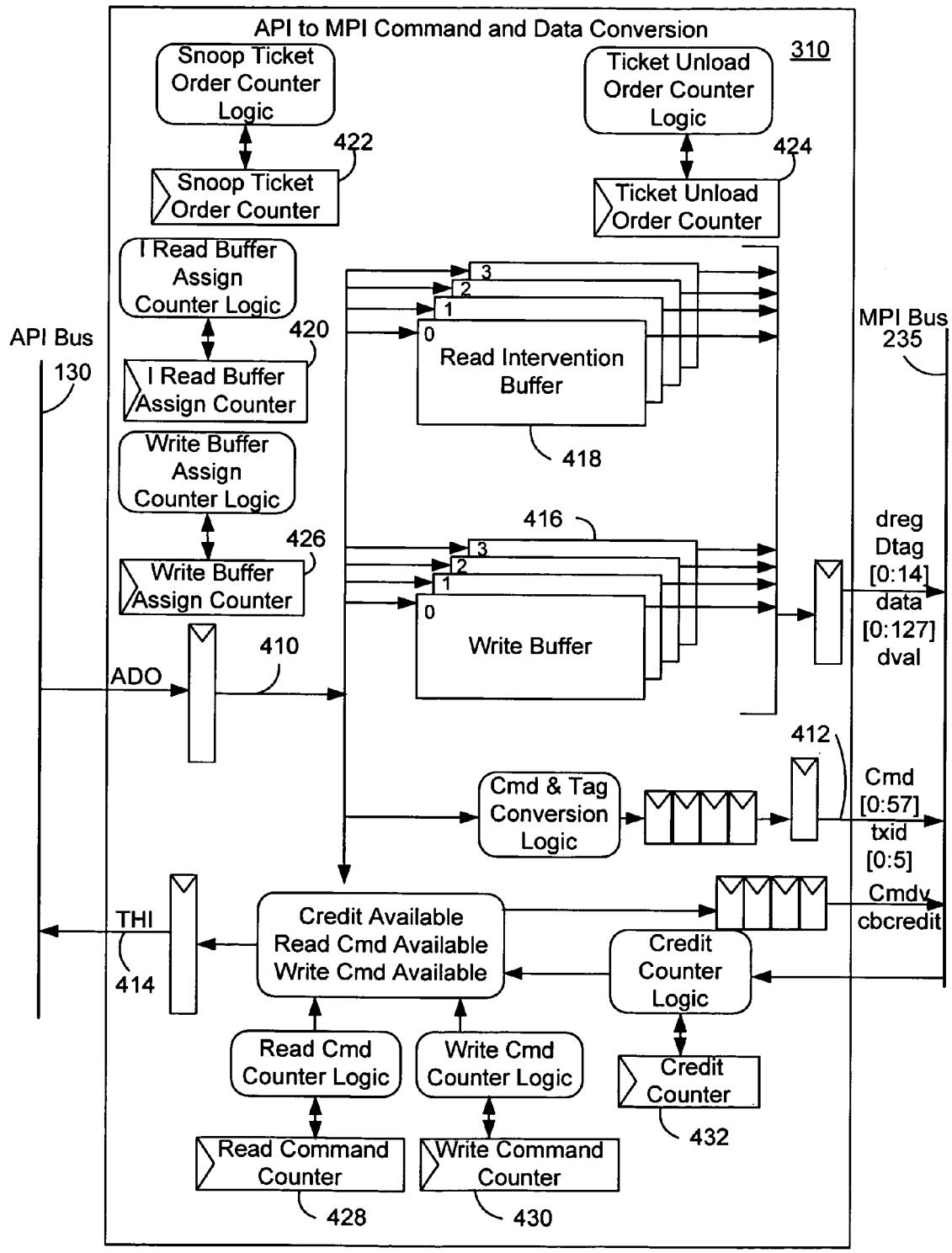
FIG. 4 is a block diagram of the API to MPI command and data conversion unit in accordance with the preferred embodiments.

FIG. 4 further illustrates the AMB API to MPI command and data conversion unit (A/M Conversion Unit) 310 according to a preferred embodiment. The A/M conversion unit 310 includes logic for command and tag conversion and read and write data buffers. The A/M conversion unit 310 also includes several counters to control and coordinate data and commands through the AMB. When system resources are available, commands are sent directly from the API ADO bus 410 to the MPI cmd, and Txid bus 412 with 3 cycles of latency and an ack is sent back to the GPUL via the THI 414 on the MPI bus 130. If system resources are not available the command is not passed to the MPI and a retry is sent back to GPUL on the THI 414.

The A/M conversion unit 310 includes eight buffers 416, 418. Each of the buffers 416, 418 are 128 bytes in size and are partitioned into two groups, the write buffers 416 and the read intervention buffers 418. The write buffers 416 capture the write data following a write command from the GPUL. This data is held until the accumulated snoop response phase of the transaction. At this point in time if the accumulated snoop response is to retry, the state of the write buffer is reset to Idle and the buffer is ready for reuse. If the accumulated snoop response is Ack then the write buffer state machine is allowed to advance to the unload buffer state, at which point the data is sent out on the MPI bus 235. The read intervention buffers 418 capture the data written out from the GPUL on the API bus 130 when the GPUL is responding with read intervention data. A read intervention buffer 418 is assigned a transaction tag from the snoop sub unit 330 (FIG. 3), at the end of the accumulated snoop response phase of a read with modified intervention. The intervention buffer assigned (selected) this transaction is based on the Iread buffer assign counter 420. Also at this point in time the read intervention buffer 418 is assigned a ticket (number) from the snoop ticket order counter 422. This ticket (number) is used in conjunction with the ticket unload order counter 424 to maintain a first in first out order. After the intervention buffer has been assigned a tag, the buffer starts looking at intervention data from the GPUL on the API bus 130 and when a Ttag match is made the intervention buffer state machine 610 (see FIG. 6 and the associated discussion) loads the intervention data into its buffer 612.

After the data is loaded and the buffer's turn to unload comes up as signaled by the ticket unload order counter 424, the intervention buffer unloads the data to the CBI via the MPI. The snoop ticket order counter 422 and the ticket unload order counter 424 are used to maintain a first-in-first-out order of data to be sent out on the MPI, from the accumulated snoop response phase of a transaction to the data phase of the transaction. These two counters are used for both write and read intervention buffers. Each time a ticket is dispensed and captured by the assigned buffer, the snoop ticket order counter 422 is incremented. Similarly when any buffer in this sub unit reaches the unload finished state, the ticket unload order counter 424 is incremented. The Iread buffer assign counter 420 is used to assign which read intervene buffer will accept the next intervention data. This counter is incremented each time a read intervention buffer state machine leaves the idle state. The write buffer assign counter 426 is used to assign which write buffer 416 will accept the next write data. This counter 426 is incremented each time a write buffer state machine 510 (see FIG. 5) leaves the idle state. The read command counter 428 maintains a count of outstanding read commands. When the count reaches the number of read buffers (4) it signals the handshake logic driving the THI to retry all read commands. The counter is incremented with each valid read command that is sent out on the MPI. The read command counter 428 is decremented when any read buffer exits the unload finished state or when a read initiated from the GPUL on the API bus 130 receives an accumulated snoop response of retry.

The write command counter 430 maintains a count of outstanding write commands. When the count reaches the number of write buffers (4) it signals the handshake logic driving the THI to retry all write commands. The counter is incremented with each write command that is acknowledged and sent on to the MPI and is decremented when any write buffer exits the unload finished state. The credit counter 432 maintains a count of commands that can be sent to the CBI via the MPI. When the count is non-zero, commands can be sent to the CBI on the MPI. If the credit count is zero all commands are given a handshake of retry via the THI. The credit counter 432 is incremented with each cbcredit cycle from the CBI. The counter is decremented when any command is forwarded to the CBI on the MPI.

Figure 5:
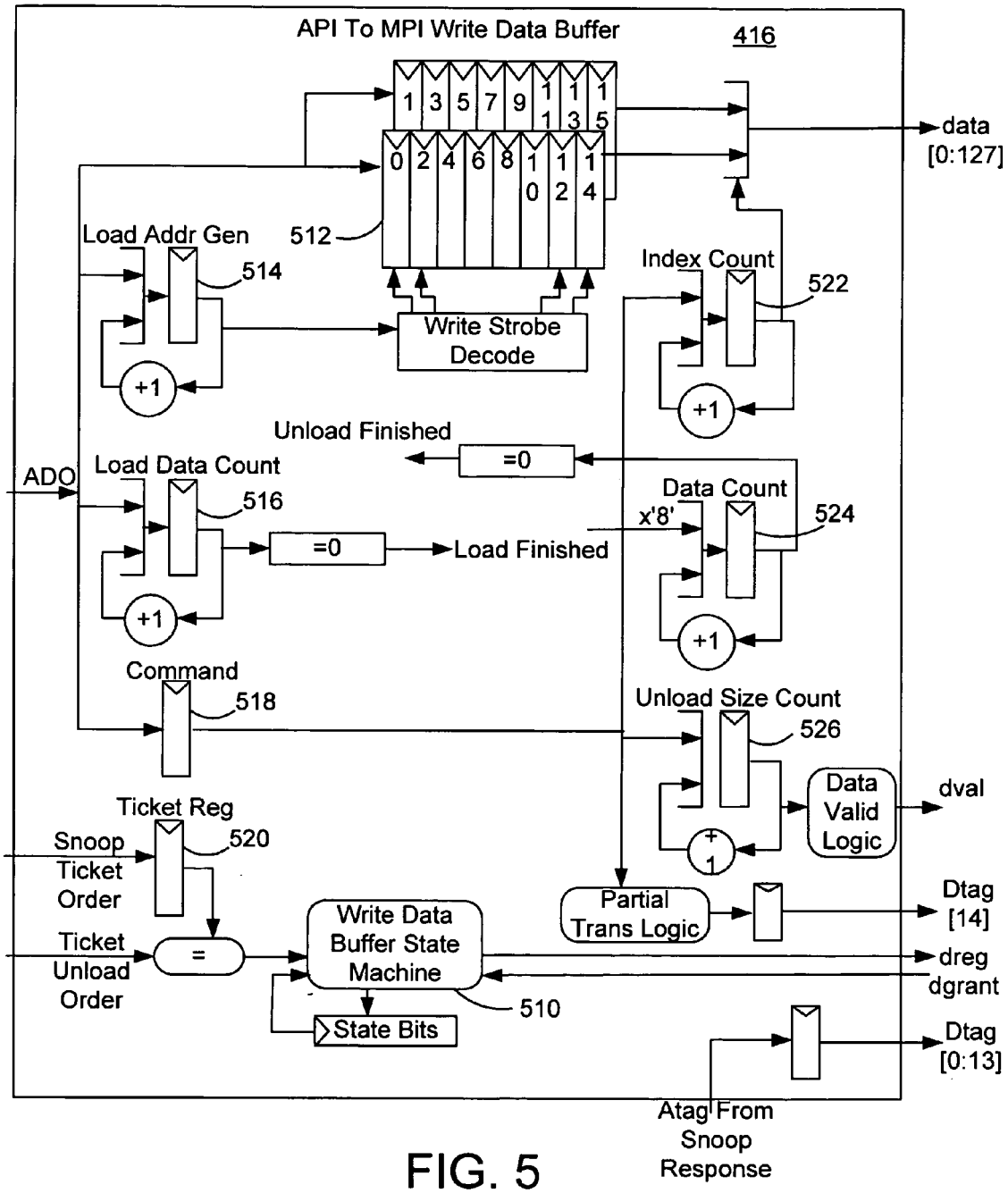
FIG. 5 is a block diagram of the API to MPI write data buffer in accordance with the preferred embodiments.

FIG. 5 is a Block diagram of one of the AMB API to MPI write data buffers (write buffer) 416 shown in FIG. 4. There are 16-64 bit registers 512 (one 128 byte cache line) in each of the four buffers 416. Each write buffer 416 is used to hold the data from the GPUL until the CBI is ready to accept the data after the accumulated snoop response phase of the command. This section describes the inner workings of each write buffer 416. As can also be seen in FIG. 5, there are a set of counters registers and conversion logic used in the control and coordination of the write data. The load address generator 514 captures the low order start address bits from the ADO and uses this value as the starting index to write data into the write data buffer array 512. After each data cycle the address generator 514 is incremented to point to a new write data location. The start address bits are the system Addr bits[57,58,59,60], and the address source bits—ADO [33,34,65,66].

The load data count 516 captures the data count from the ADO and decrements with each write into the write buffer. When this counter reaches '0001' the write data buffer state machine 510 is allowed to advance beyond the load state. The command register 518 maintains an original copy of the command from the ADO. The ticket register 520 is part of the mechanism to maintain a first-in-first-out order from accumulated snoop response to the unloading of data to the MPI. The ticket register 520 captures a ticket count when a write transaction command has an accumulated snoop response of ack. When the value in the ticket register equals the unload order counter the state machine 510 is then allowed to advance to the unload state. The write data buffer state machine 510 coordinates the loading and unloading of data.

The index count 522 is used in the unload state to select which buffer register data to put on the MPI data bus. The data count 524 counts unload cycles and is always initialized to 8 before the unload state. The fixed initial count is because the MPI always expects 8 cycles of data regardless of the data size being delivered. The unload size count is initialized to the transaction size and is used to create the data valid signal (dval) on the MPI. The unload size counter 526 counts down to zero and as long as the value is non-zero the output data is valid. The transfer size fields from the ADO Command Register 518 are used as the initial value loaded into the unload size count 526 to be used by each write buffer. The unload size counter handles decrementing by the number of write data bytes per transaction that needs to be unloaded from the write data buffers as well as driving the data valid logic. The number of decrements varies by transaction.

No reordering of write data packets takes place in the API to MPI write data buffers 416. Reordering is not required because all GPUL write commands including write, castout, push, and partial writes with a transfer size of 8 bytes or more are aligned on an address boundary equal to the size of the transfer. As data packets are received from the GPUL (ADO) they will be placed into the data buffer such that the index into the buffer array are the least significant bits of the system address for each 8 byte quantity.

Figure 6:
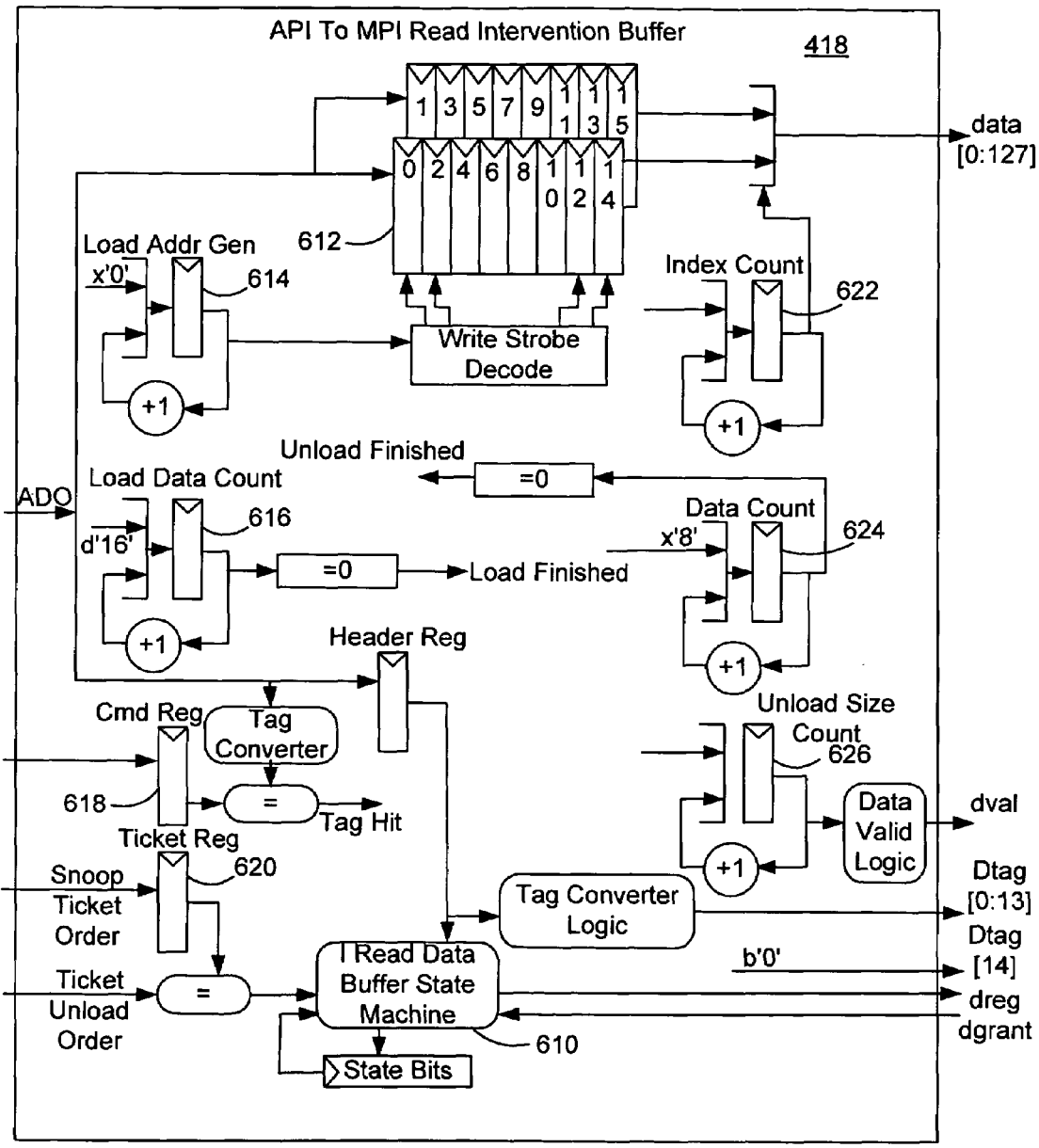
FIG. 6 is block diagram of the API to MPI read intervention buffer in accordance with the preferred embodiments.

FIG. 6 shows a Block diagram of one of the AMB API to MPI read intervention data buffers (read intervention buffers) 418. There is an array of 16-64 bit registers 612 (one 128 byte cache line) in each of the four read intervention buffers 418 that are used to gather the read intervention data from the GPUL and hold the data until the CBI is ready to accept the data. This following paragraphs describe the inner workings of each read intervention buffer 418.

After the accumulated snoop response phase of a read intervention the command read intervention buffer is assigned the command and is given an order ticket. At this point in time the buffer starts looking at read intervention headers on the ADO and when a tag compare (tag hit) occurs the buffer state machines 610 start loading the following data into the read intervention registers 612. After the load is complete the state machine 610 waits for a comparison from the unload order counter 424 (FIG. 4) at which point the state machine unloads the data to the MPI bus 130.

As can also be seen in FIG. 6 there are a several counter registers and conversion logic used in the control and coordination of read intervention data. The load address generator 614 is initialized to zero and is used to as the index for the write data strobe into the register array 612 of the read intervention data buffer 418. The load data count 616 is initialized to a count of 16 and decrements with each write strobe into the read intervention buffer registers 612. When this counter reaches '0000' the state machine 610 is allowed to advance beyond the load state.

The Command register 618 maintains an original copy of the command from the flow control after the accumulated snoop response. The ticket register 620 is part of the mechanism to maintain a first-in-first-out order from accumulated snoop response to the unloading of data to the MPI bus 130. The ticket register 620 captures a ticket count when a read intervention transaction command has an accumulated snoop response of ack. When the value in the ticket register 620 equals the unload order counter the read intervention data buffer state machine 610 is then allowed to advance to the unload state. The read intervention data buffer state machine 610 coordinates the loading and unloading of data.

The index count 622 is used in the unload state to select which buffer register data to put on the MPI data bus. For the read intervention buffer this will always be initialized to 0 because all read interventions are a full 128 bytes in size and are aligned to an index of 0. The data count register 624 counts unload cycles and is always initialized to 8 before the unload state. The fixed initial count is because the MPI always expects 8 cycles of data regardless of the data size being delivered. The unload size count 626 is initialized to the transaction size and is used to create the data valid signal (dval) on the MPI bus. The counter counts down to zero and as long as the value is non-zero the output dval is valid. For the read intervention buffer this will always be initialized to 8 because all read interventions are a full 128 bytes in size. The dtag is converted from the Ttag in the header register. This conversion drives dtag[0:13]. The dtag[14] is the partial transfer bit and is always driven to binary '0'.

No reordering of read intervention data within packets takes place in the API to MPI read intervention data buffer 418. Reordering is not required because all read intervention requests will be 128 bytes in size and will be at an aligned address corresponding to the 128 byte size.

Figure 7:
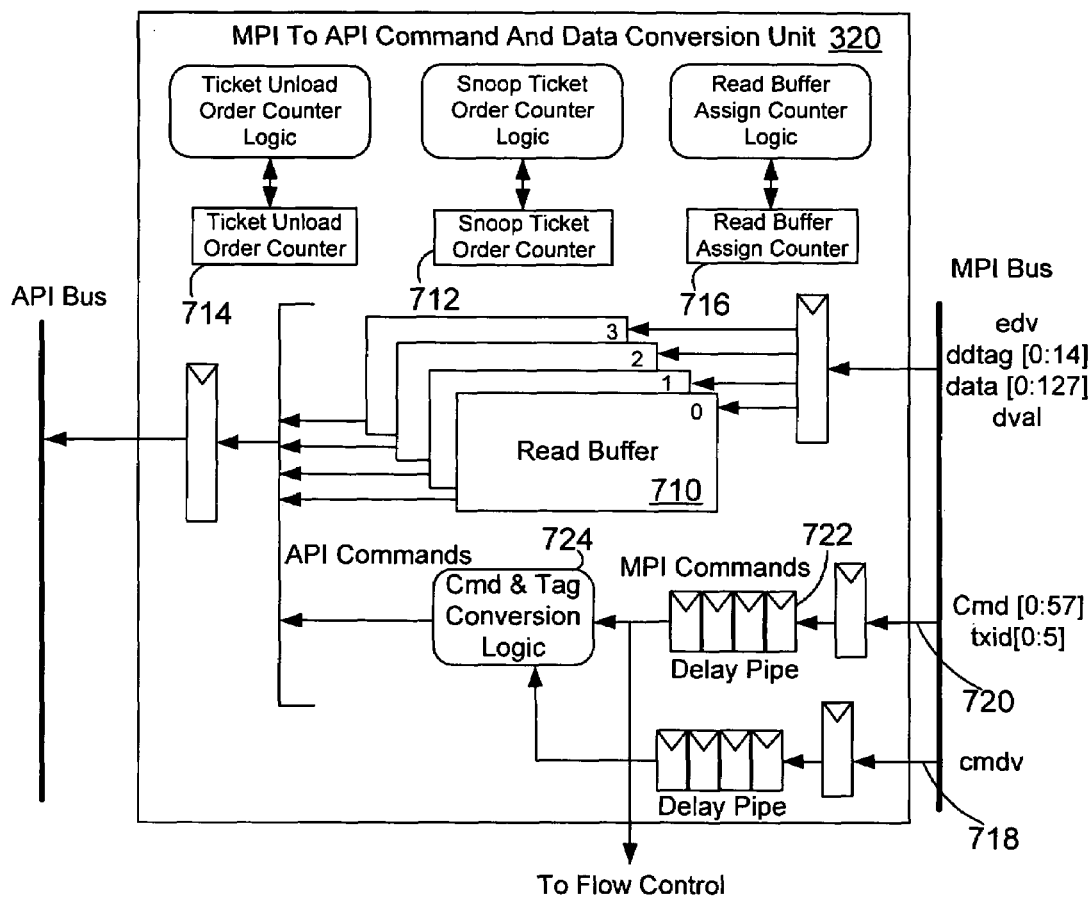
FIG. 7 is a block diagram of the API to MPI command and data conversion unit in accordance with the preferred embodiments.

FIG. 7 is a Block diagram of the AMB MPI to API command and data conversion unit 320. This unit converts MPI Data and Commands into API data and commands. Commands always flush directly through the unit with two cycles of latency. The data from GPUL Reads is temporarily stored in one of four read buffers 710 in this unit. There are also several counters that aid in the ordering and coordination of data and commands in this unit as described further below.

The snoop ticket order counter 712 and the ticket unload order counter 714 are used to maintain a first-in-first-out order of data to be sent out on the MPI, from the accumulated snoop response phase of a transaction to the data phase of the transaction. Each time a ticket is dispensed and captured by the assigned buffer, the snoop ticket order counter 712 is incremented. Similarly when any buffer reaches the unload finished state, the ticket unload order counter 714 is incremented. The read buffer assign counter 716 is used to assign which read buffer will accept the next read data. This counter is incremented each time a read buffer state machine leaves the idle state.

The signals cmdv 718 and Cmd 720 are part of the MPI bus command tenure handshake. Cmdv 718 is a command valid signal and is 1'b1 the beat before a valid command (Cmd) is issued on the MPI bus. This applies to both the master initiated initial command or the reflected commands. The MPI commands from the cmd pass through a delay pipe 722 and are converted to API command by the command and tag conversion logic 724.

Figure 8:
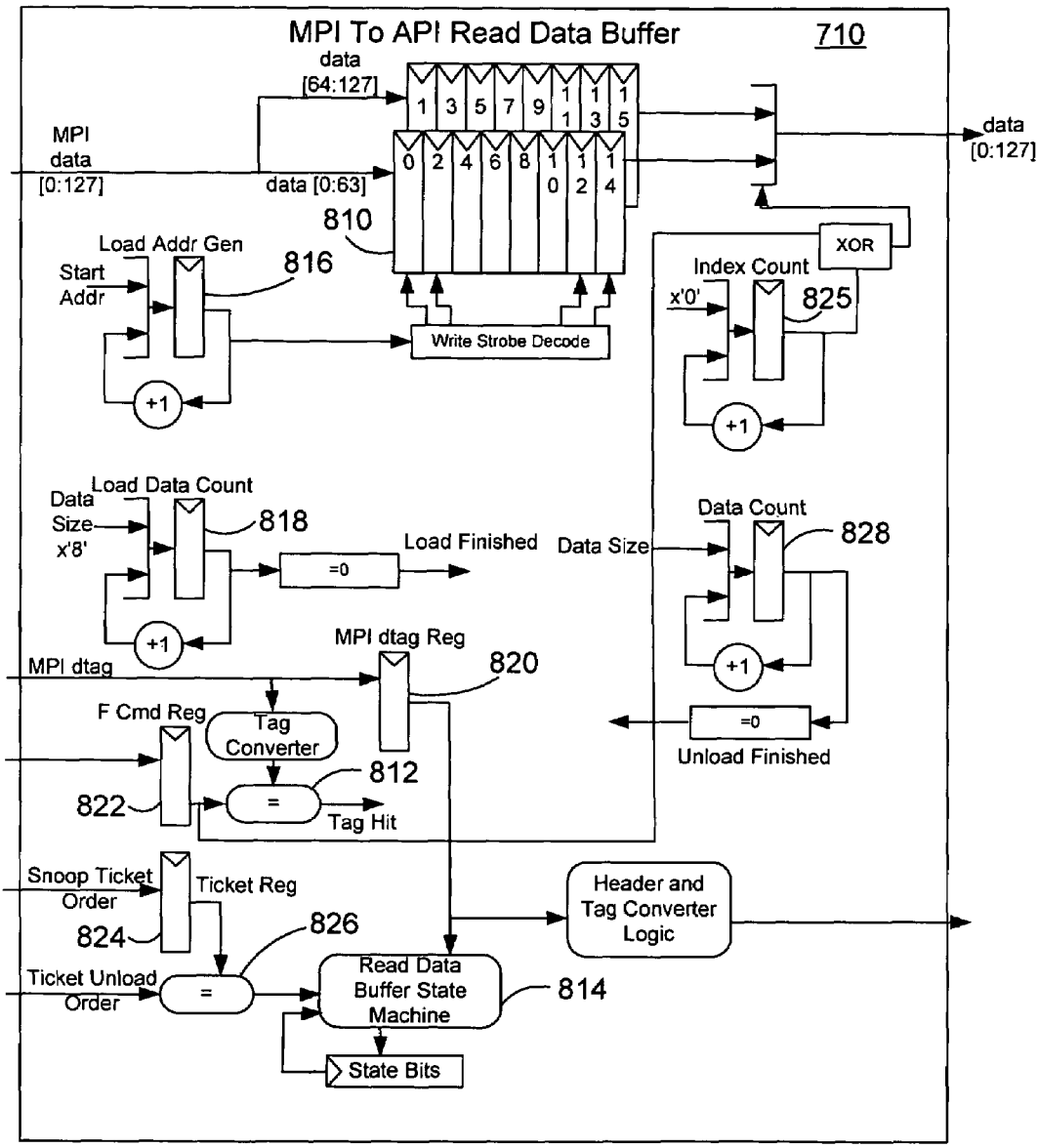
FIG. 8 is a block diagram of the MPI to API read data buffer in accordance with the preferred embodiments.

FIG. 8 is a Block diagram of the MPI to API read data buffers (read buffers) 710. There are 16-64 bit registers 810 (one 128 byte cache line) in each of the four read buffers 710. The read buffers are used to gather all of the read data from the CBI and hold the data for reordering for the GPUL. This section of this document describes the inner workings of each read buffer 710. After the accumulated snoop response phase of a read command, a read buffer 710 is assigned the command and is given an order ticket. At this point in time the read buffer 710 starts looking at read tags on the MPI bus and when a tag compare (tag hit) 812 occurs, the buffer state machines 814 start loading the following data from the MPI bus into the read buffers. After the load is complete the state machine waits for a comparison from the unload order counter at which point the state machine 814 unloads the data to the API. The unload order counter holds the index count.

As can also be seen in FIG. 8 there are a set of counters, registers and conversion logic used in the control and coordination of read data. The load address generator 816 is initialized to the start address from the flow control command and is used as the index for the load data into the read data buffer array 810. The load data count 818 is initialized to the data size from the flow control command and decrements with each write strobe into the read buffer. When this counter reaches '0000' the state machine 810 is allowed to advance beyond the load state. The MPI dtag register 820 maintains an original copy of the dtag from the MPI bus. The flow control command register 822 (F Cmd Reg) maintains an original copy of the command from the flow control after the accumulated snoop response.

The ticket register 824 is part of the mechanism to maintain a first-in-first-out order from accumulated snoop response to the unloading of data to the MPI. The ticket register 824 captures a ticket count when a read intervention transaction command has an accumulated snoop response of ack. When the value in the ticket register 824 equals the unload order counter 826, the state machine 814 is then allowed to advance to the unload state.

The read data buffer state machine 814 coordinates the loading and unloading of data. The index count 825 in conjunction with a bit-wise 'exclusive or' (xor) of the start address is used during the unload state to select which buffer register data to put on the ADI of the API bus. It is this 'xor' function that creates the critical word first interleaved packet order required by GPUL. In the read buffer 710 this counter will always be initialized to b'0000'. The address select bits are defined as follows: Select[0:2]<--start addr[0:2] xor index count[0:2] and Select[3]<--index count[3].

The data count register 828 counts unload cycles. The count is initialized from the data size field of the flow control command register 822 before the unload state. The Ttag in the API header is generated from a converted dtag from the MPI dtag Register 820.

Reordering of read data packets takes place in the MPI to API read data buffers. This reordering is required because GPUL only accepts read data in critical word first interleaved packet order and the rest of the system starting with the CBI only uses linear ordering with no notion of critical word first. When GPUL requests a read, the request, is forwarded to CBI. When CBI returns data it will simply return the amount of data requested in with the least significant address quadword of the data returned first and the most significant address quadword returned last. These quadwords are placed into the data buffer with the least significant system address bits being used as the index into the buffer. Data is unloaded out of the read buffer in the order required by GPUL.

The order that read data must be sent to GPUL is dependent on the low order address being requested from GPUL. These least significant address bits are not forwarded or returned from the CBI, rather they are maintained in the flow control unit from the original GPUL request in the API to MPI converter sub unit and are latched in the read buffer in the Flow Command Register (F Cmd Reg).

The tag conversion logic converts the API transfer tag into the MPI transfer tag format and back. The API Transfer Tag uses 9 bits. These 9 bits are defined in 2 fields, the master number (4 bits) and the master tag (5 bits). The MPI defines a transfer tag in (14 bits). The fields associated with the MPI transfer tag are the node ID (4 bits), the unit ID (4 bits), and the transaction ID (6 bits). A simplified tag mapping from the API bus to the MPI can be made as follows. The Master number of the API can map to the Unit ID of the MPI and back, and the Master Tag of the API can map to the Transaction ID of the MPI. The problem with this mapping is the Master tag on the API side is 5 bits and the Transaction ID on the MPI side is 6 bits. With some assumptions and two simple signal redirections from the simplified mapping the following mapping solves the problem. For this embodiment the assumptions are the MPI transfer tag Node ID is always b'0000', and the MSB of the MPI Unit ID is always b'0'. Given these assumptions the following mapping is made.

Command tag and data tag translation from the API to the MPI use the following relationships:

MPI Ttag[0:3]<--MPI Node ID [0:3]<--b'0000'

MPI Ttag[4:7]<--MPI Unit ID [0:3]<--b'0' & API Master Number [1:3]

MPI Ttag[8:13]<--MPI Transaction ID [0:5]<--API Master Number [0] & API Master Tag [0:4]

Command tag and data tag translation from the MPI to the API use the following relationships;

API_cmd[7:10]<--API Ttag[0:3]<--API Master Number[0:3]<--MPI Transaction Number[0] & MPI Unit ID[1:3]

API_cmd[11:15]<--API Ttag[4:8]<--API Master Tag [0:4]<--MPI Transaction Number[1:5]

In a straight forward mapping with no assumptions the API Master Number[0] would be assigned the MPI Unit ID[0]. This mapping uses the assumption that the Unit ID[0] is always 0 and uses the API Master Number position to save the MPI Transaction Number[0] because in the straight forward mapping there is not room for this bit. The consequences of this mapping is that GPUL will see more Master Numbers than are actually in the system.

Figure 9:
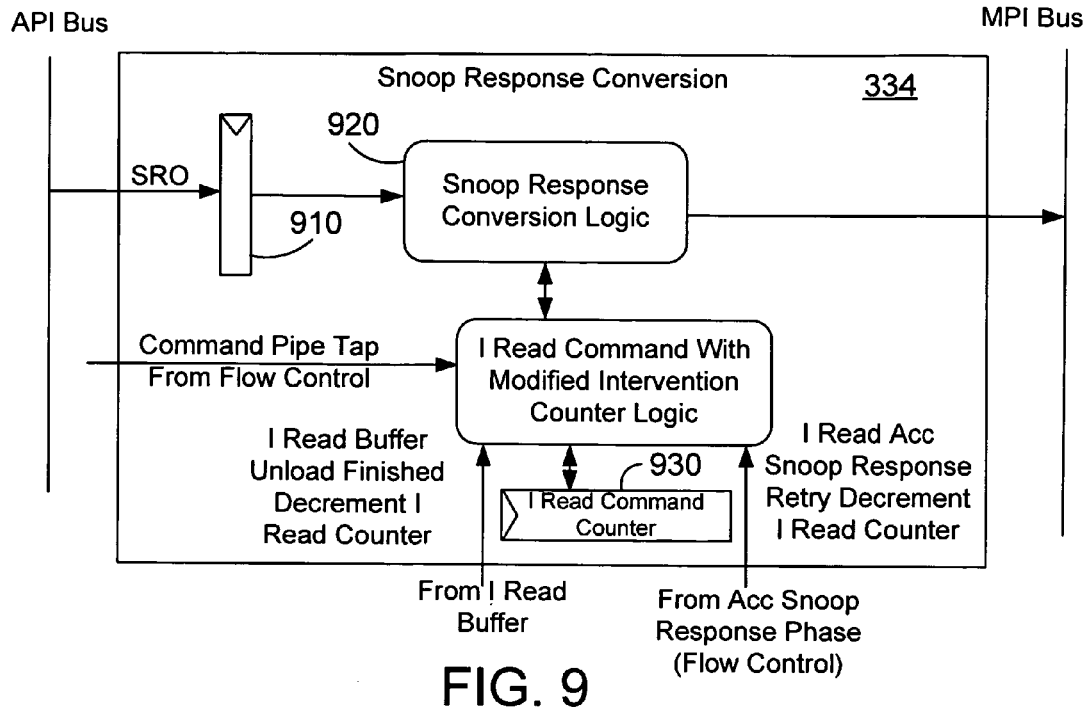
FIG. 9 is a block diagram of the snoop response conversion unit in accordance with the preferred embodiments.

FIG. 9 is a Block diagram of the AMB Snoop Response Conversion Unit 334 shown in FIG. 3. The SRO register 910 is a free running register that captures the snoop response from the elastic interface 220 (FIG. 2). The output of the SRO register 910 drives logic 920 that converts the snoop response from the API domain to the MPI domain. So as to not over run the number of read intervention buffers available there is an I read command counter 930 included in the architecture to count outstanding intervention read commands.

The logic in the snoop response path and the I Read Counter gathers read information from the reflected command path pipe and the snoop response from GPUL for the reflected read. If the snoop response is modified intervention, and if the outstanding intervention command count is equal to or greater than the number of intervention buffers (4) then the reflected command is changed from a modified intervention to a retry and sent on to the CBI via the MPI. If the outstanding intervention count is less than the number of intervention buffers then the snoop response from the GPUL (modified intervention) is passed on to the CBI.

The I read command counter 930 maintains a count of all read interventions that pass through the snoop response phase including ones that are converted to retry by the snoop response conversion logic. For every snoop read intervention response that comes from GPUL the counter is incremented. For each accumulated read intervention response the counter is decremented by 1. As each read intervention buffer reaches the finished unload state the counter is also decremented by 1. If an accumulated snoop response I read retry occurs at the same time as a read intervention buffer finish state then the counter must be decremented by 2.

Figure 10:
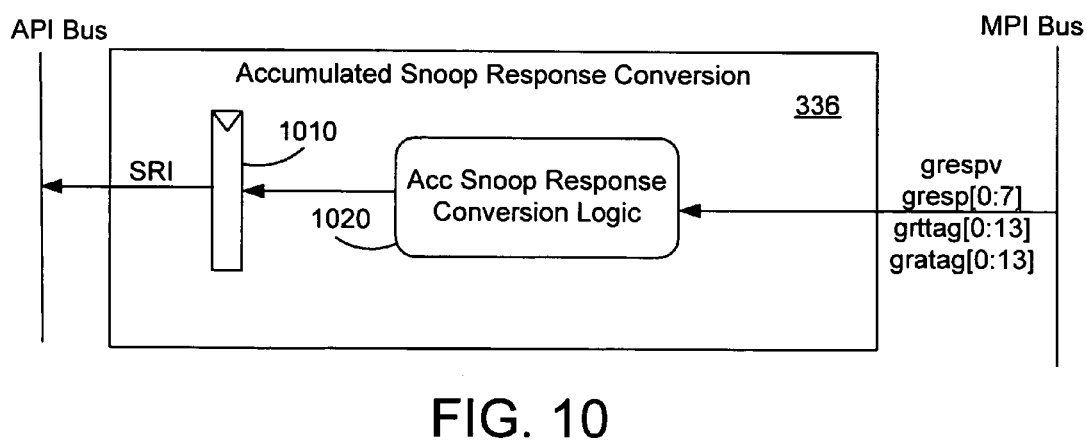
FIG. 10 is a block diagram of the accumulated snoop response conversion unit in accordance with the preferred embodiments.

FIG. 10 is a Block diagram of the AMB accumulated snoop response conversion unit 336 of the snoop response unit 330. The Accumulated snoop response from the CBI via the MPI (gresp[0:7]) is converted to the API protocol and latched in a free running latch, the SRI latch 1010. The SRI latch 1010 is controlled by the Acc snoop response conversion logic 1020. The Acc snoop response conversion logic 1020 converts the global combined snoop responses from the MPI (gresp) into an API SRI snoop format.

Figure 11:
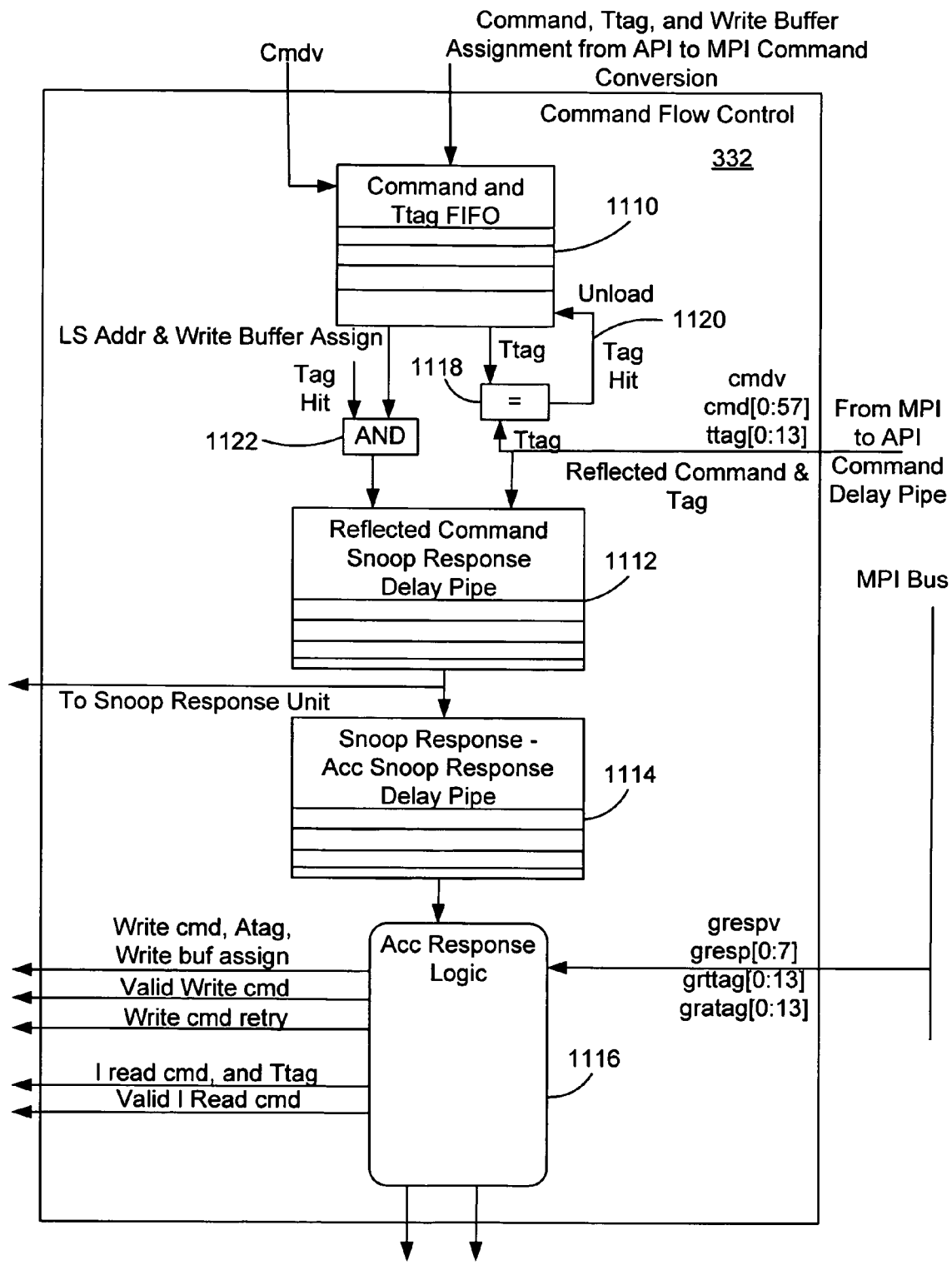
FIG. 11 is a block diagram of the command flow control unit in accordance with the preferred embodiments.

FIG. 11 is a block diagram of the AMB command flow control unit (command flow unit) 332. The command flow unit 332 maintains command information for all outstanding commands that flow between the GPUL and the CBI as well as CBI to GPUL. There are four major blocks in the command flow unit 332, the command and Ttag FIFO 1110, the reflected command to snoop response delay pipe 1112, the snoop response to accumulated snoop response delay pipe 1114, and the accumulated response logic 1116.

The command and Ttag FIFO (FIFO) 1110 stores the GPUL read commands that are forwarded to the CBI. Since the CBI does not use all the least significant address bits from the GPUL read commands, these bits are not forwarded to the CBI. But, these least significant bits are required by the read data buffers when returning read data to the GPUL. The command and Ttag FIFO is used to hold the commands received from the GPUL and then match them with the returning reflected command so the properly formatted data and command are returned by the read data buffers. Additionally the write buffer assignment number for a GPUL read command is also captured in the FIFO 1110. The command and Ttag FIFO 1110 captures all valid commands initiated from GPUL that are sent out to the CBI on the MPI. Commands that are not valid because of a handshake retry on the THI are not put into the FIFO 1110.

The command and Ttag FIFO 1110 is required to be a FIFO instead of a PIPE because there is no set time between the initial command and the reflected command. Further, it is not required to be a content addressable memory (CAM) because the reflected commands from CBI will come back in the order that they were sent out. To unload the FIFO 1110, a comparison 1118 between the FIFO Ttag and the reflected command Ttag from CBI is made. When a comparison determines there is a tag hit 1120, the least significant address data and the write buffer assignment number are allowed to enter the reflected command to snoop response delay pipe 1112 by merging 1122 the least significant address data and the write buffer assignment number with the reflected command. The command and Ttag FIFO 1110 is then allowed to advance to the next command.

The reflected command to snoop response delay pipe 1112 is a free running pipe of registers that are deep enough such that all command information reaches the snoop response sub unit at the same time that the snoop response for the command is returned from GPUL.

The snoop response to accumulated snoop response delay pipe 1114 is also a free running pipe of registers that are deep enough such that all command information reaches the accumulated snoop response sub unit at the same time that the accumulated snoop response for the command is returned from CBI.

The accumulated response logic 1116 takes the information from the snoop response to accumulated snoop response delay pipe 1114 with the accumulated snoop response from CBI and forwards command information to the collection of write buffers, I read buffers, and read buffers. The write buffers need to know when a write command receives an accumulated snoop response of acknowledged so it can start its unload state, or if the command accumulated snoop response is a retry the write buffer will reset to the idle state. The original write buffer number that was assigned (write buffer assigned) to this write command is also passed back to the write buffers so the appropriate write buffer is communicated with. The intervention read buffers require the command, the Ttag, and the knowledge that the accumulated snoop response for this read intervention command has been acknowledged so an assignment of a read intervention buffer can be made for this command. The read buffers require the command, the Ttag, and the knowledge that the accumulated snoop response for this read command has been acknowledged so an assignment of a Read buffer can be made for this command.

Transaction Translation Flow

FIGS. 12 through 15 show examples of the transaction translation flow through the AMB 230. In each of these figures, the transaction flow begins at the top of the page and progresses toward the bottom of the page, and moves to the left or right as indicated by the arrows. Transaction flow movement from left to the right represents movement across the bus bridge from the API bus to the MPI bus, and from right to left from the MPI bus to the API bus. The dotted horizontal lines indicate changes in the phase of the transaction as the flow moves from the top to the bottom.

Figure 12:
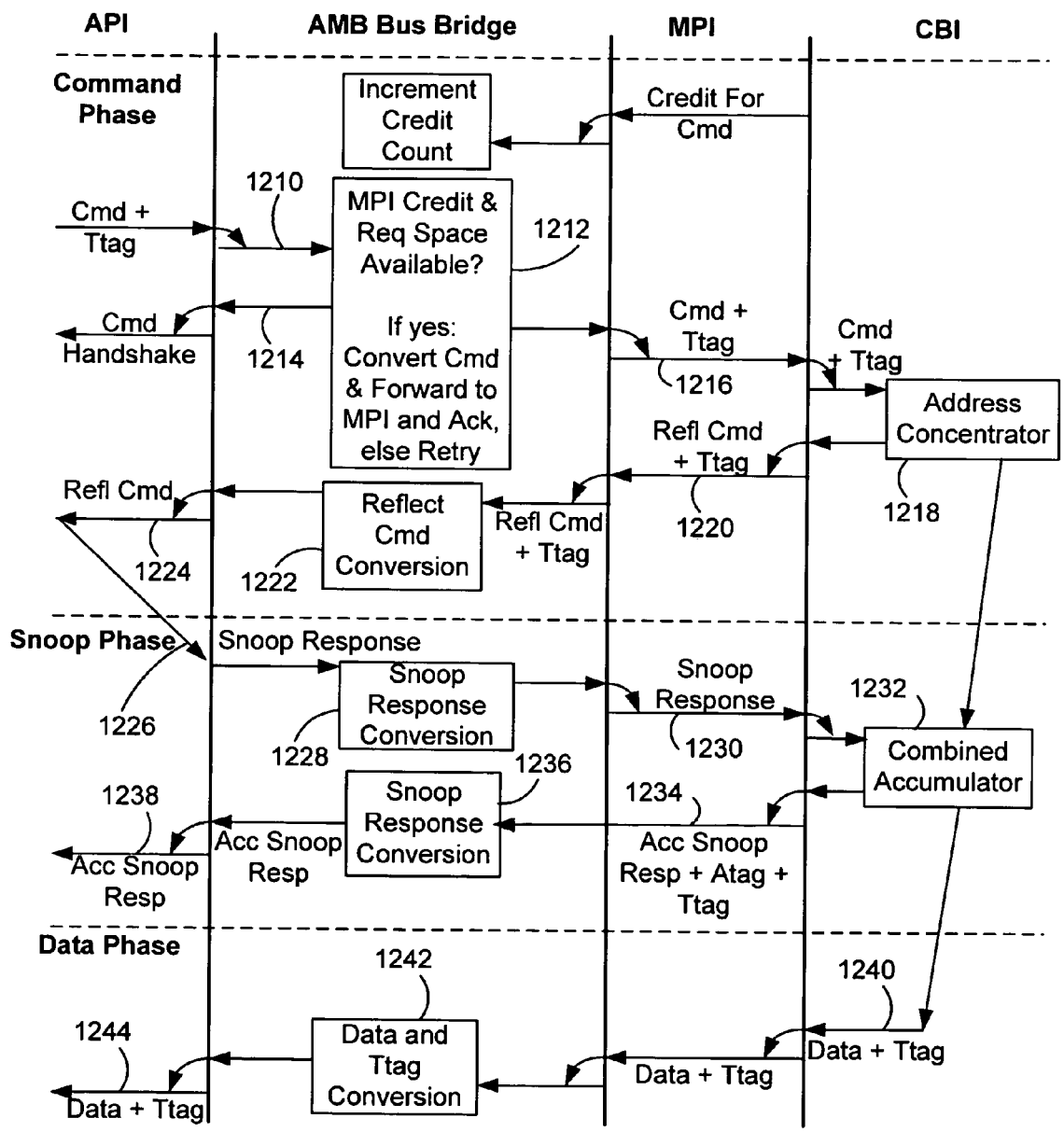
FIG. 12 is a block diagram of the API to MPI transaction translation flow of a read transaction through the bridge in accordance with the preferred embodiments.

FIG. 12 shows an example of the read protocol from the API bus to the CBI on the MPI bus. In this example a read is initiated from the GPUL in the command phase and is sent to the AMB via the elastic interface and the API bus. The AMB accepts the command and tag 1210, and based on resource availability 1212 the AMB either accepts the command from GPUL or requests a retry via the command handshake signals (THI) 1214 on the API bus. If accepted, the command is converted to the MPI protocol and passed on 1216 to the CBI via the MPI bus. The command is also placed in the command and Ttag FIFO 1110 in the flow control sub unit so command information can be passed on to data buffers to complete the transaction. After receiving the command from the AMB 1218, the CBI reflects the command 1220. The AMB converts the reflected command 1222 from the MPI domain to the API and passes this back 1224 to GPUL via elastic interface and the API bus. The GPUL will then put a snoop response out 1226 on the API in the beginning of the snoop phase. The AMB will convert 1228 the snoop response and send it out 1230 on the MPI. The CBI will take all of the snoop responses from all of the snoop responders, generate an accumulated snoop response 1232, and send this back out 1234 on the MPI. The AMB will convert 1236 this accumulated snoop response back into the API domain to be received 1238 by the GPUL. Later in the data phase after a slave device has responded to the CBI with data, the CBI will put 1240 this data out on the MPI bus. The AMB then converts 1242 this data header, tag, and order from the MPI domain to the API domain. This conversion takes place in the read buffer assigned to complete this transaction. The AMB then places 1244 the data on the API bus.

Figure 13:
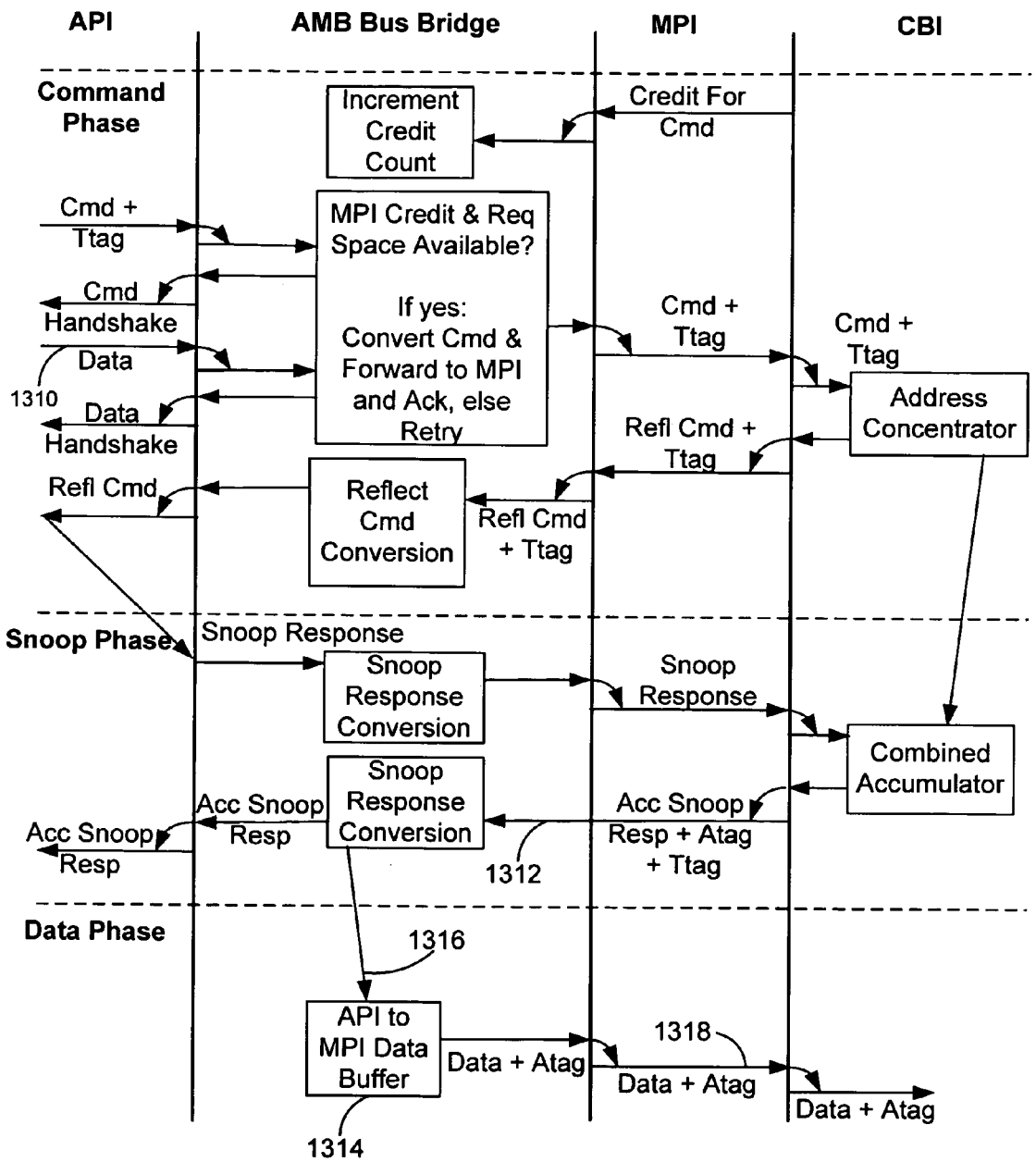
FIG. 13 is a block diagram of the API to MPI transaction translation flow of a write transaction through the bridge in accordance with the preferred embodiments.

FIG. 13 shows an example of the write protocol on the AMB 230. Again in this transaction the initiator is the GPUL. In the API protocol the write data immediately follows the command. This data is stored in one of the 4 write data buffers in the AMB and is held until the accumulated snoop response is sent back from the CBI. The command and snoop response conversion proceeds the same as described for the read protocol with reference to FIG. 12. The difference is the data is being written to the MPI instead of being read. When the accumulated snoop response is sent back from the CBI 1312, the write buffer 1314 is signaled 1316 by the flow control sub unit to unload its data out on the MPI 1318.

Figure 14:
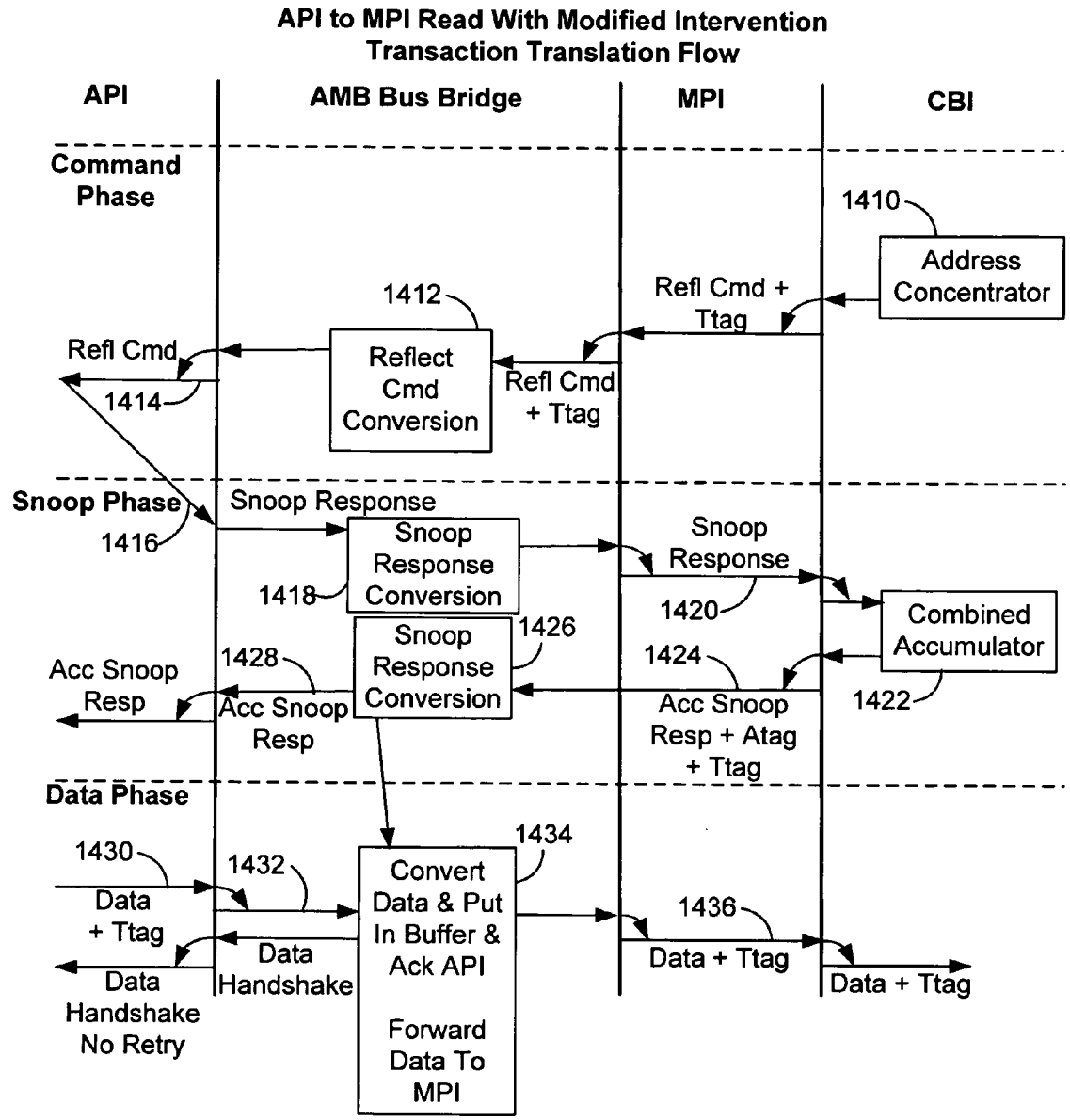
FIG. 14 is a block diagram of the MPI to API transaction translation flow of a read with modified intervention transaction through the bridge in accordance with the preferred embodiments.

FIG. 14 shows an example of a command read with modified intervention protocol as seen by the AMB. This transaction would be initiated from another master device and transferred through the CBI 1410 and the MPI to the AMB. The AMB converts 1412 this command and forwards it 1414 to the GPUL via the API. During the Snoop response phase GPUL will send 1416 its snoop response from the reflected command. The snoop response is converted 1418 from API to MPI and sent on 1420 to the CBI. The CBI then generates 1422 the accumulated snoop response and puts it 1424 out on the MPI. The AMB converts this 1426 and sends it 1428 to the GPUL. This snoop conversion happens in a similar way as the commands that were initiated by the GPUL. GPUL has the data being requested in the read intervention transaction, as such the GPUL in the data phase forwards 1430 this data to the AMB via the API. The AMB must accept 1432 this data from the GPUL, the data handshake retry on the THI is not an option. The AMB puts this data into the API to MPI command and data conversion unit's intervention data buffers. The intervention buffers also convert 1434 the tag, and size before forwarding 1436 this data to the CBI via the MPI. Pacing of the intervention commands so as to not over run the intervention buffers is accomplished with the intervention command counter. This counter counts the number of outstanding intervention commands that have been reflected. If this count gets to the number of intervention buffers (4) then a snoop response of retry is injected into the snoop response path within the AMB.

Figure 15:
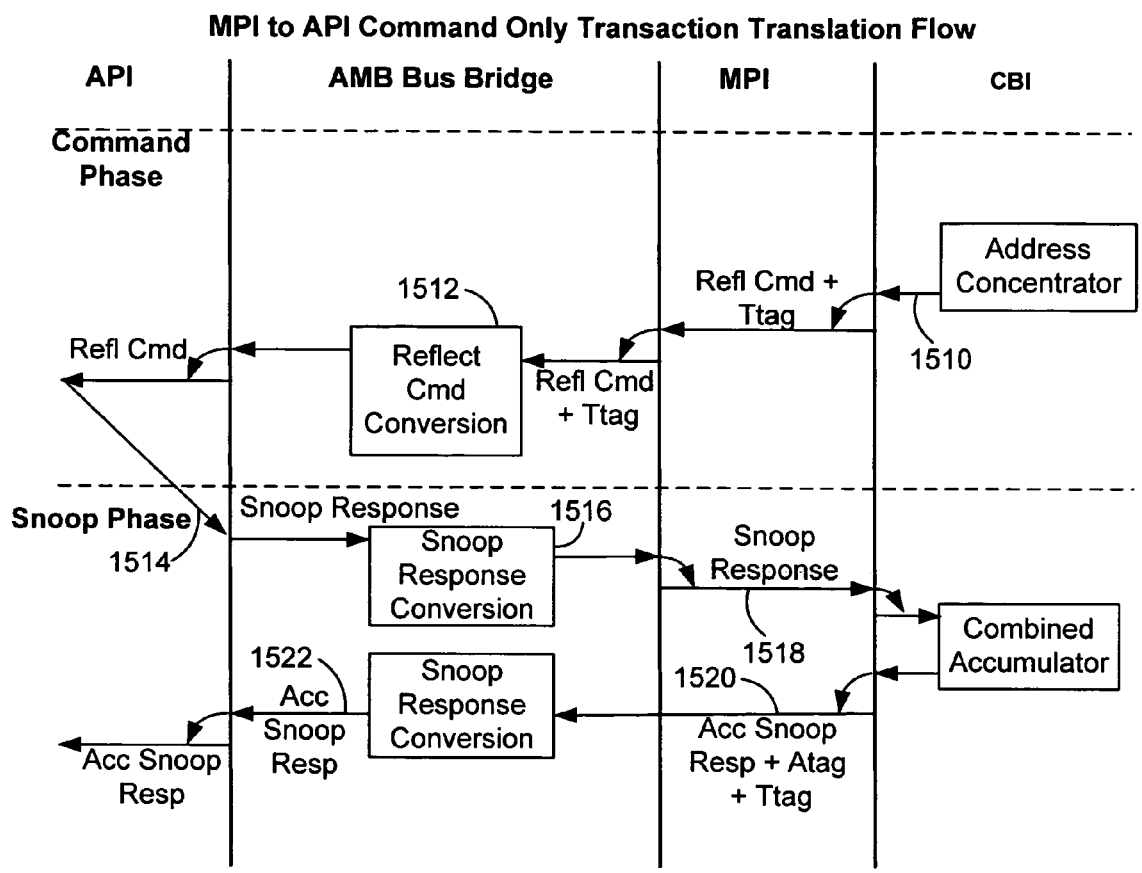
FIG. 15 is a block diagram of the MPI to API transaction translation flow of a command only transaction through the bridge in accordance with the preferred embodiments.

FIG. 15 shows an example of a command only protocol as seen by the AMB 230. This transaction would be initiated from another device other than the GPUL and transferred 1510 through the CBI and the MPI as a reflected command. This could come in the form of a FLUSH. A FLUSH is API bus transaction type that does not have a data tenure and is used to signal an API bus master such as the GPUL to evict a cache line. The AMB 230 would convert 1512 this reflected command and forward it to the GPUL via the API. During the Snoop response phase the GPUL will send 1514 its snoop response from the reflected command. The snoop response is converted 1516 from API to MPI and sent 1518 on to the CBI. The CBI then generates the accumulated snoop response 1520 and puts it out on the MPI. The AMB 230 converts this and sends it 1522 to the GPUL. This snoop conversion happens in a similar way as the commands that were initiated by the GPUL. If the GPUL has the data being requested a separate new command would be initiated by GPUL to flush the cache.

The embodiments described herein provide important improvements over the prior art. The preferred embodiments will provide the computer industry with a high speed interface for an existing computer architecture for an overall increase in computer system performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments are discussed herein with particular regard to multi-chip modules, the computer system and methods of the preferred embodiments may be applied to any semiconductor computer system architecture including a single chip computer system.

What is claimed is:

1. A flow control mechanism for a bus bridge that provides conversion between a first bus and a second bus in a computer processor system comprising:
    a command and tag FIFO that stores a portion of a command sent from the first bus to the second bus until a reflected command is received from the second bus;
    a reflected command - snoop response delay pipe that stores the reflected command until a snoop response is received; and
    a snoop response to accumulated snoop response delay pipe that stores the reflected command until an accumulated snoop response is received.

2. The flow control mechanism of claim 1 wherein the command and tag FIFO further comprises a compare circuit that determines when the reflected command from the second bus is the same as a command stored in the FIFO.

3. The flow control mechanism of claim 1 wherein the command and tag FIFO further comprises a merge circuit that combines least significant address data and a write buffer assignment number stored in the FIFO with the reflected command to generate merged data and stores the merged data in the reflected command - snoop response delay pipe.

4. The flow control mechanism of claim 1 further comprising an accumulated snoop response logic block that takes information from the snoop response to accumulated snoop response delay pipe along with an accumulated snoop response from the second bus and forwards command information to a plurality of buffers.

5. A flow control mechanism for a bus bridge that provides conversion between a Giga-Processor Ultralite (GPUL) bus and an interface bus in a computer processor system comprising:
    a command and tag FIFO that stores a portion of a command sent from the GPUL bus to the MPI bus until a reflected command is received from the interface bus;
    a reflected command - snoop response delay pipe that stores the reflected command until a snoop response is received; and
    a snoop response to accumulated snoop response delay pipe that stores the reflected command until an accumulated snoop response is received.

6. The flow control mechanism of claim 5 wherein the command and tag FIFO further comprises a compare circuit that determines when the reflected command from the MPI bus is the same as a command stored in the FIFO.

7. The flow control mechanism of claim 5 wherein the command and tag FIFO further comprises a merge circuit that combines least significant address data and a write buffer assignment number stored in the FIFO with the reflected command to generate merged data and stores the merged data in the reflected command - snoop response delay pipe.

8. The flow control mechanism of claim 5 further comprising an accumulated snoop response logic block that takes information from the snoop response to accumulated snoop response delay pipe along with an accumulated snoop response from the interface bus and forwards command information to a plurality of buffers.

9. A computer processor system comprising:
    a processor with a first bus;
    a transceiver with a bridge that provides a conversion between the first bus and a second bus;
    wherein the bridge includes a flow control mechanism comprising a command and tag FIFO that stores a portion of a command sent from the first bus to the second bus until a reflected command is received from the second bus; and
    a reflected command - snoop response delay pipe that stores a reflected command until a snoop response is received; and
    a snoop response to accumulated snoop response delay pipe that stores the reflected command until an accumulated snoop response is received.

10. The computer processor system of claim 9 wherein the processor and the transceiver are separate chips integrated together on a multi-chip module.

11. The computer processor system of claim 9 wherein the command and tag FIFO further comprises a compare circuit that determines when the reflected command from the second bus is the same as a command stored in the FIFO.

12. The computer processor system of claim 9 wherein the command and tag FIFO further comprises a merge circuit that combines least significant address data and a write buffer assignment number stored in the FIFO with the reflected command to generate merged data and stores the merged data in the reflected command - snoop response delay pipe.

13. The computer processor system of claim 9 further comprising an accumulated snoop response logic block that takes information from the snoop response to accumulated snoop response delay pipe along with an accumulated snoop response from the second bus and forwards command information to a plurality of buffers.

14. A method of transaction flow control for a bus bridge in a computer processor system comprising the steps of:
    storing a portion of a command and tag sent from a first bus in a FIFO until a reflected command is received from the second bus;
    comparing the reflected command from the second bus to determine if it is the same as a command stored in the FIFO;
    storing the reflected command in a delay pipe a snoop response is received; and
    storing the reflected command in a second delay pipe until an accumulated snoop response is received.

15. The method of claim 14 further comprising the step of merging least significant address data and a write buffer assignment number stored in the FIFO with the reflected command to generate merged data and stores the merged data in the reflected command - snoop response delay pipe.

16. The method of claim 15 further comprising the step of:
    forwarding the command information in the second delay pipe along with an accumulated snoop response from the second bus to a plurality of buffers.

17. A method of transaction flow control for a bus bridge in a computer processor system comprising the steps of:

storing a portion of a command and tag sent from a Giga-Processor Ultralite (GPUL) bus in a FIFO until a reflected command is received from an interface bus;

comparing a reflected command from the interface bus to determine if it is the same as a command stored in the FIFO;

storing the reflected command in a delay pipe until a snoop response is received; and storing the reflected command in a second delay pipe until an accumulated snoop response is received.

18. The method of claim 17 further comprising the step of merging least significant address data and a write buffer assignment number stored in the FIFO with the reflected command to generate merged data and stores the merged data in the reflected command - snoop response delay pipe.

19. The method of claim 17 further comprising the step of:

forwarding the command information in the second delay pipe along with an accumulated snoop response from the interface bus to a plurality of buffers.

* * * * *